United States Patent
Cho (10) Patent No.: US 6,240,214 B1
(45) Date of Patent: May 29, 2001

(54) METHOD AND APPARATUS FOR ENCODING A BINARY SHAPE SIGNAL

(75) Inventor: Sung-Ryul Cho, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/210,834

(22) Filed: Dec. 15, 1998

(30) Foreign Application Priority Data

Feb. 27, 1998 (KR) .................................................. 98-6363

(51) Int. Cl.[7] ........................................................ G06K 9/36
(52) U.S. Cl. ............................................................. 382/247
(58) Field of Search .................................... 382/181, 232, 382/236, 239, 238, 243, 254, 247, 276

(56) References Cited

U.S. PATENT DOCUMENTS

| | | | | |
|---|---|---|---|---|
| 5,970,164 | * | 10/1999 | Bamberger et al. | 382/128 |
| 5,999,189 | * | 12/1999 | Kajiya et al. | 345/430 |
| 6,049,631 | * | 4/2000 | Kim | 382/239 |
| 6,094,225 | * | 7/2000 | Han | 375/240.16 |

* cited by examiner

Primary Examiner—Joseph Mancuso
Assistant Examiner—Ali Bayat
(74) Attorney, Agent, or Firm—Pennie & Edmonds LLP (57) ABSTRACT

An apparatus encodes a binary shape signal by using an adaptive context-based arithmetic encoding technique. To this purpose, the apparatus includes a first encoding block for encoding the binary shape signal by using a first context-based arithmetic encoding technique for processing the binary shape signal on a pixel-by-pixel basis to thereby generate first encoded data, a second encoding block for encoding the binary shape signal by using a second context-based arithmetic encoding technique for processing the binary shape signal on a subblock-by-subblock basis to thereby produce second encoded data, wherein the binary shape signal is partitioned into a multiplicity of subblocks and the number of pixels in each subblock is smaller than the number of pixels in the binary shape signal and larger than 1, a bit calculation block for ciphering the numbers of bits of the first and the second encoded data and comparing the calculated numbers with each other, and a selection block for choosing either the first or the second encoded data whose bit number is smaller than that of the other based on the comparison result and providing the selected data as the encoded binary shape signal.

8 Claims, 9 Drawing Sheets

METHOD AND APPARATUS FOR ENCODING A BINARY SHAPE SIGNAL

FIELD OF THE INVENTION

The present invention relates to a method and apparatus for coding a binary shape signal; and, more particularly, to an adaptive context-based arithmetic coding method and apparatus for enhancing the coding efficiency of the binary shape signal.

DESCRIPTION OF THE PRIOR ART

A binary shape signal, representing the location and shape of an object, can be expressed as a binary alpha block (BAB) of P×Q, e.g., 16×16, binary pixels within a frame or video object plane (VOP), wherein each binary pixel has a binary value, e.g., 0 or 255, representing either a background pixel or an object pixel. A BAB can be encoded by using a conventional bit-map-based shape coding method such as a context-based arithmetic encoding (CAE) method.

Figure 7A:
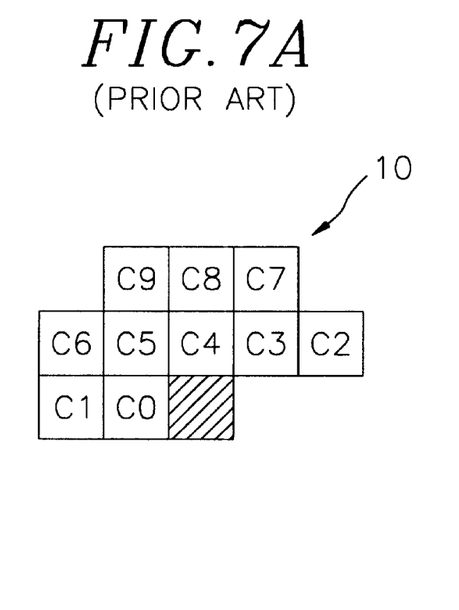
FIGS. 7A and 7B represent an intra-context and an inter-context for one pixel, respectively.
Figure 8:
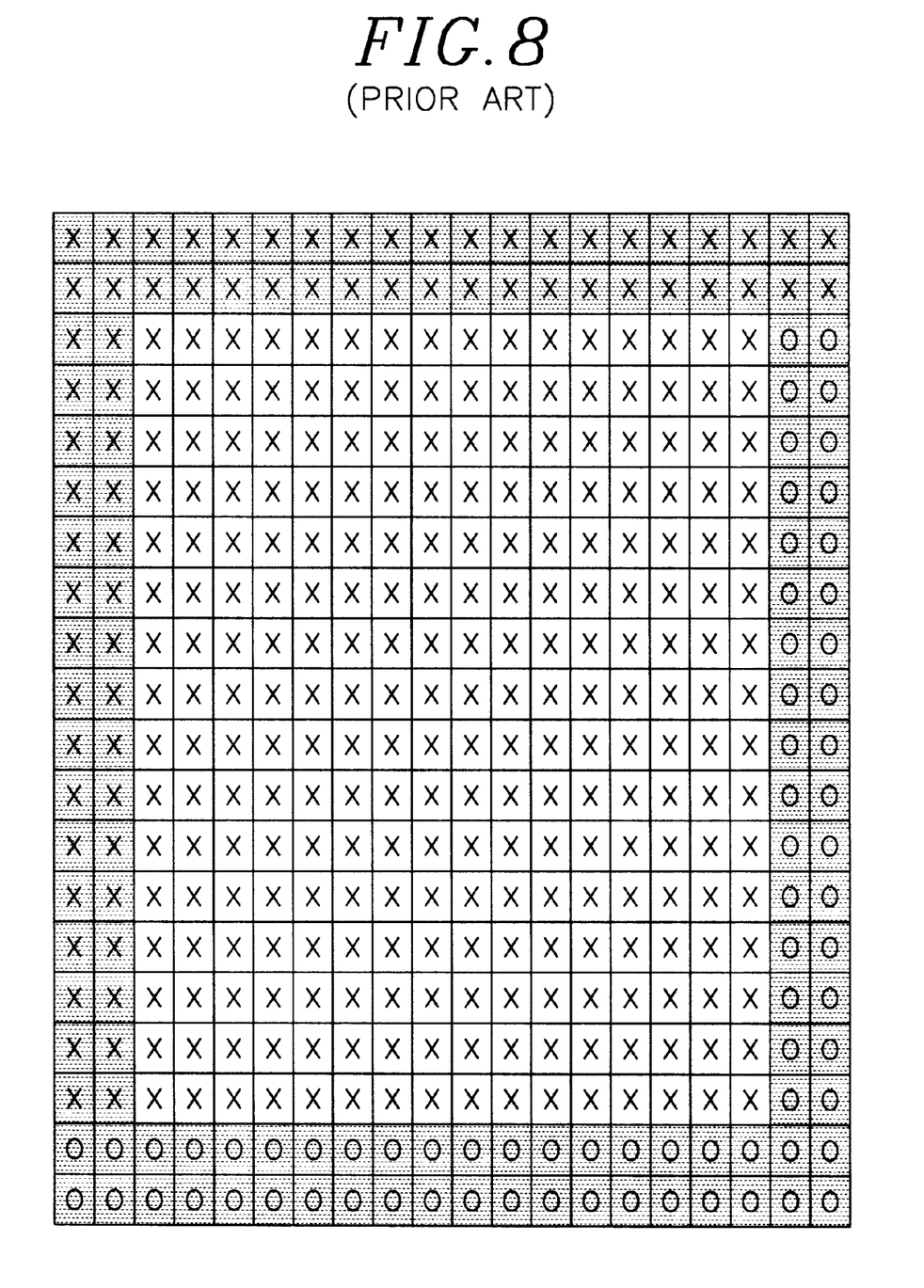
FIG. 8 shows a current bordered BAB.

For instance, for an intra-frame, a current BAB is encoded by using a conventional intra-CAE technique, wherein each pixel in the current BAB is arithmetically coded based on an intra-context comprised of a set of pixels selected from a current frame. In other words, when encoding the current BAB, pixels from neighboring BAB's are used to make up the intra-context. A border of width 2 around the current BAB is used in order to provide a current bordered BAB as depicted in FIG. 8. In FIG. 8, the pixels in the light area of the current bordered BAB are the part of the current BAB to be encoded and the pixels in the dark area of the current bordered BAB are the border pixels. These are obtained from the neighboring BAB's of the current BAB except for those marked '0' which are unknown at a decoding time. Based on the current bordered BAB, the intra-context is selected as shown in FIG. 7A. Therefore, in FIG. 7A, a shaded pixel, i.e., a pixel in the current BAB, is encoded by using its intra-context 10 comprised of, e.g., C0 to C9.

Figure 7B:
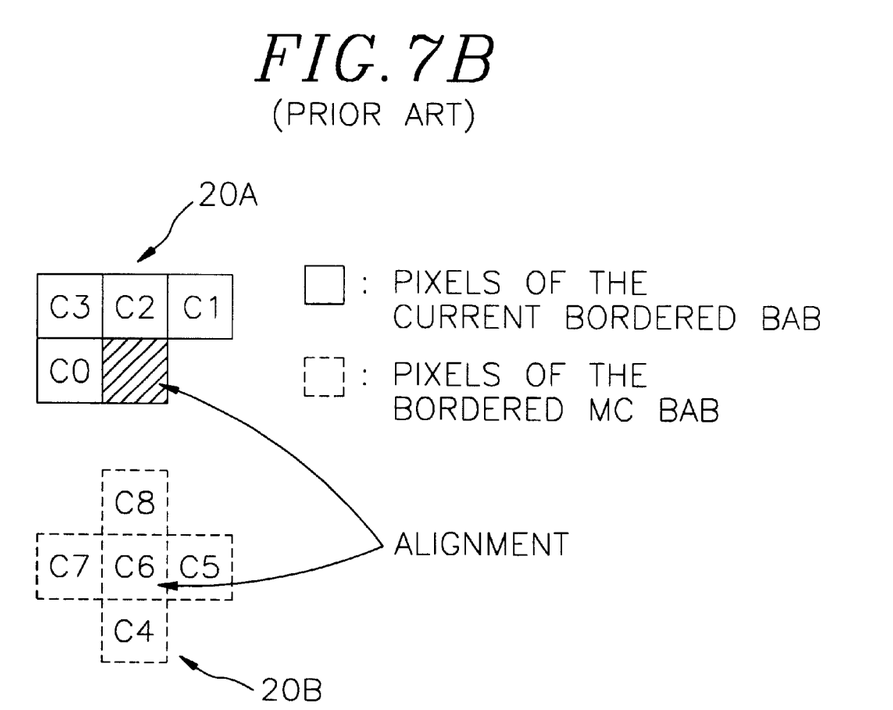
Figure 9:
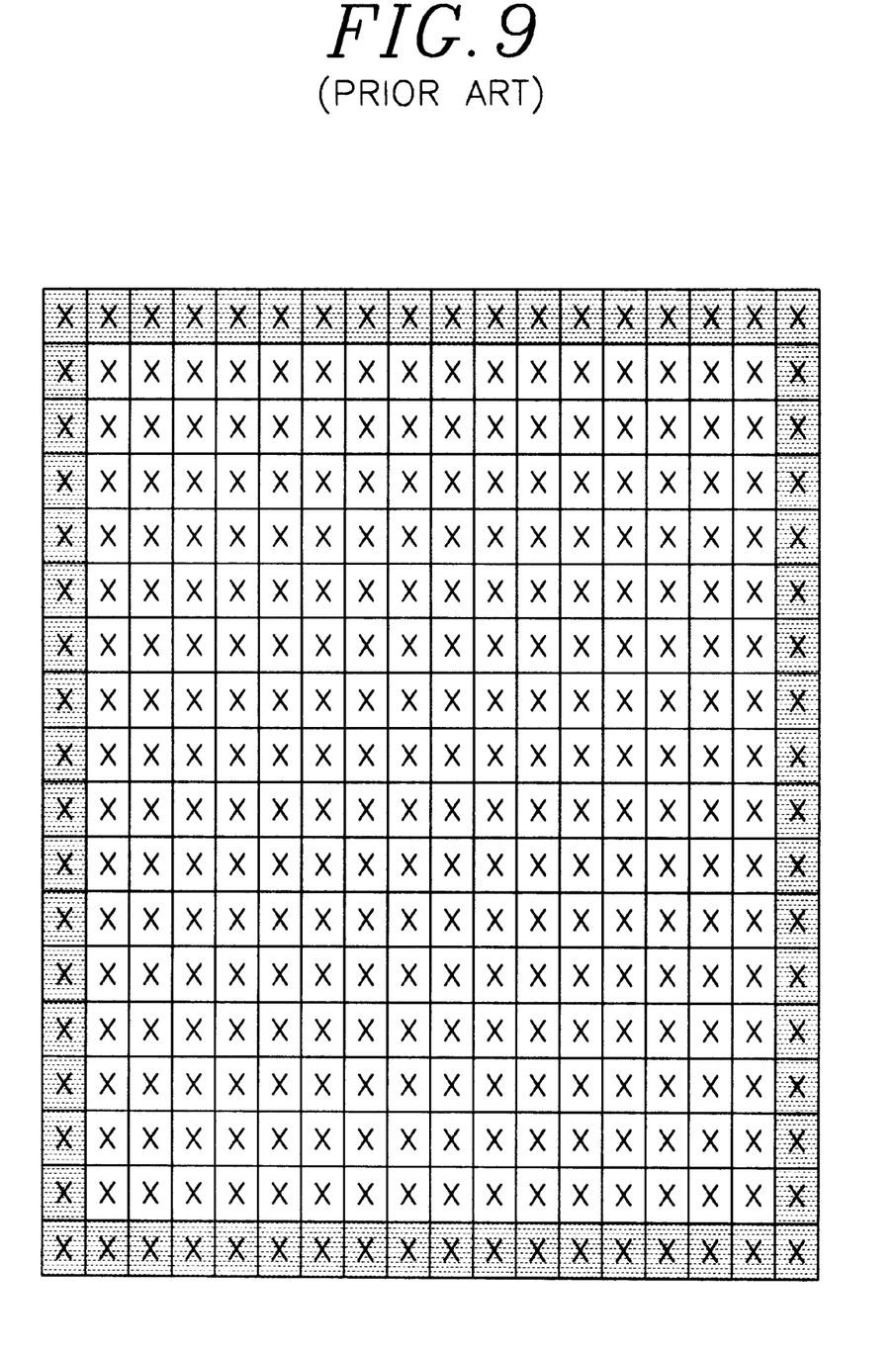
FIG. 9 describes a bordered motion compensated BAB.

For an inter-frame, the current BAB may be coded by using either the intra-CAE or an inter-CAE technique depending on whichever CAE technique between the two generates a less amount of encoded data. According to the inter-CAE technique, an error representing a difference between the current BAB and each of predetermined candidate BAB's thereof included in a previous frame is calculated first and a most similar candidate BAB and a motion vector are found by a motion estimation technique, wherein the most similar candidate BAB represents a candidate BAB generating a least error among the candidate BAB's, and the motion vector denotes a displacement between the current BAB and the most similar candidate BAB. Thereafter, each pixel in the current BAB is arithmetically coded based on an inter-context; and a motion vector difference (MVD) which represents a difference between the motion vector and a motion vector predictor (MVP) thereof is encoded by using, e.g., a variable length coding (VLC) scheme. Referring to FIG. 7B, the inter-context is composed of two subsets of pixels: a first subset of pixels 20A includes, e.g., C0 to C3, which are selected from pixels in the current frame in a similar manner that is used in the intra-CAE; and a second subset of pixels 20B includes, e.g., C4 to C8, which are chosen from the previous frame based on the motion vector. Namely, a border of width 1 around a motion compensated BAB, detected from the previous frame by using the motion vector, is utilized to supply a bordered motion compensated (MC) BAB as described in FIG. 9, wherein the light area corresponds to the motion compensated BAB and the dark area corresponds to the border. Once the bordered motion compensated BAB is determined, the second subset of pixels 20B including the binary pixels C4 to C8 is selected from the bordered MC BAB, wherein the pixel position of the pixel C6 is identical to that of the shaded pixel.

Accordingly, either the intra-context or the inter-context is selected as illustrated above and a context number for each of the pixels in the current BAB is calculated based on its corresponding context. Once the context number for each of the pixels in the current BAB is ciphered, a probability corresponding to the context number is detected from a probability table containing predetermined probabilities assigned to various context numbers and the detected probability is arithmetically encoded to thereby produce an encoded BAB data. For further details of the CAE techniques and the MVD, reference may be made to MPEG-4 Video Verification Model Version 7.0, International Organization for Standardization, Coding of Moving Pictures and Associated Audio Information, ISO/IEC JTC1/SC29/WG11 MPEG97/N1642, Bristol, April 1997.

Although the number of bits to be transmitted is reduced through the use of the conventional CAE technique as discussed above, a large number of bits may still be needed in transmitting the binary shape signal and, therefore, a further reduction in the number of bits used in encoding the binary shape signal is desired.

SUMMARY OF THE INVENTION

It is, therefore, a primary object of the present invention to provide a method and apparatus for encoding a binary shape signal by using an adaptive CAE technique so as to reduce the amount of transmission data.

In accordance with one aspect of the present invention, there is provided a method for encoding a binary shape signal including a plurality of binary pixels, each binary pixel having one of two different binary values, comprising the steps of:

(a) detecting distribution characteristics between the pixels in the binary shape signal to thereby produce a first or a second selection signal;

(b) in response to the first selection signal, encoding the binary shape signal by using a first context-based arithmetic encoding technique for processing the binary shape signal on a pixel-by-pixel basis to thereby generate the encoded binary shape signal; and (c) under the control of the second selection signal, encoding the binary shape signal by using a second context-based arithmetic encoding technique for processing the binary shape signal on a subblock-by-subblock basis to thereby produce the encoded binary shape signal, wherein the binary shape signal is partitioned into a multiplicity of subblocks and the number of pixels in each subblock is smaller than the number of pixels in the binary shape signal and larger than 1.

In accordance with another aspect of the present invention, there is provided a method for encoding a binary shape signal including a plurality of binary pixels, each binary pixel having one of two different binary values, which comprises the steps of:

(a) encoding the binary shape signal by using a first context-based arithmetic encoding technique for processing the binary shape signal on a pixel-by-pixel basis to thereby generate first encoded data;

(b) encoding the binary shape signal by using a second context-based arithmetic encoding technique for processing the binary shape signal on a subblock-by-subblock basis to thereby produce second encoded data, wherein the binary shape signal is partitioned into a multiplicity of subblocks and the number of pixels in each subblock is smaller than the number of pixels in the binary shape signal and larger than 1;

(c) calculating the numbers of bits of the first and the second encoded data and comparing the calculated bit numbers with each other; and (d) outputting either the first or the second encoded data as the encoded binary shape signal in conformity to the comparison result in the step (c).

BRIEF DESCRIPTION OF THE DRAWINGS

The foregoing and other objects, features and advantages of the present invention will become apparent from the following detailed description of preferred embodiments of the invention with reference to the accompanying drawings, in which.

DETAILED DESCRIPTION OF THE PREFERRED EMBODIMENTS

In accordance with the present invention, a binary shape signal is encoded by using an adaptive CAE apparatus which employs more than one CAE technique, wherein the binary shape signal includes a previous and a current picture and each picture is partitioned into a plurality of BAB's. In the adaptive CAE apparatus, the binary shape signal is processed on a BAB-by-BAB basis.

Figure 1:
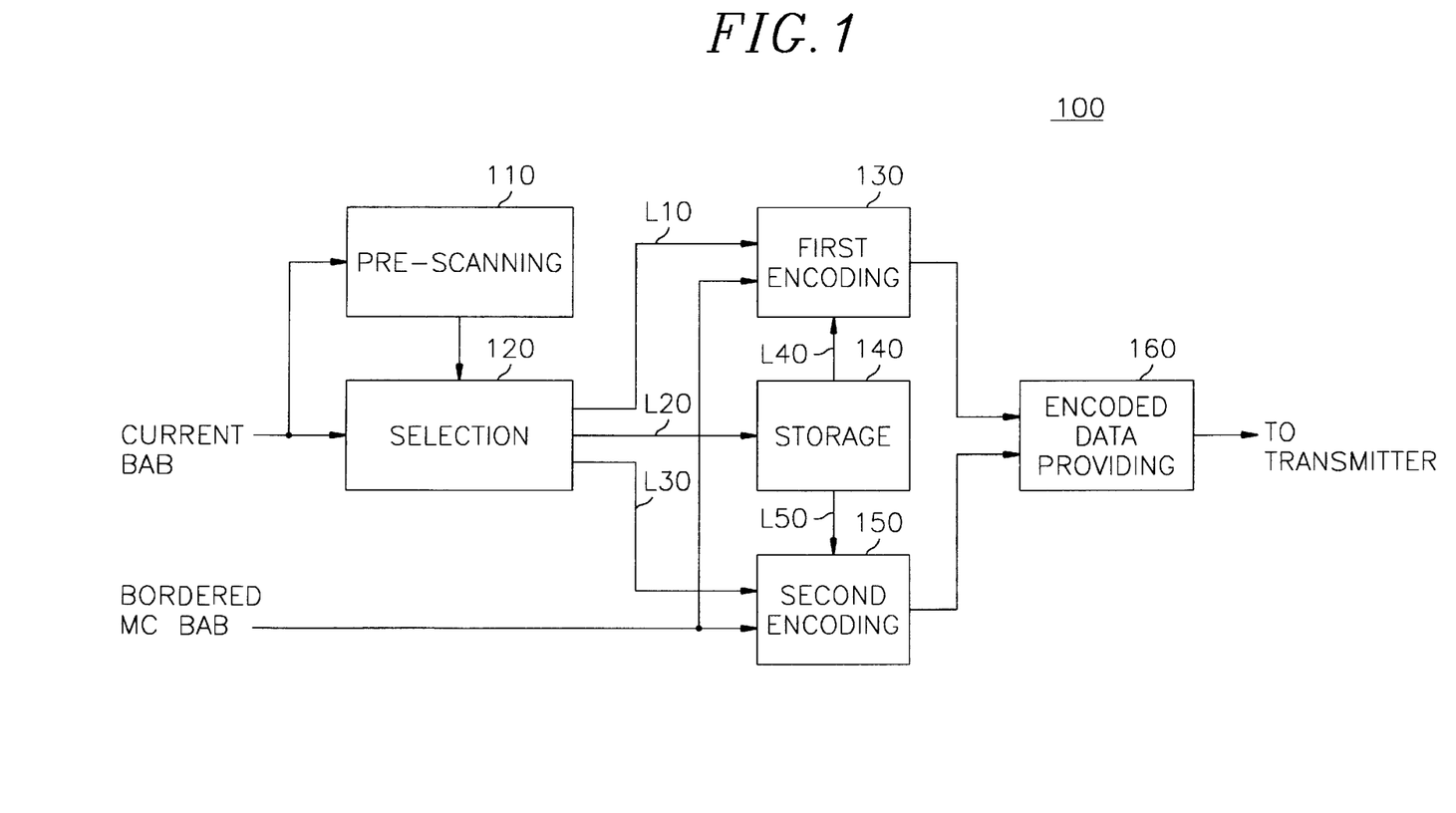
FIG. 1 represents a block diagram of an adaptive context-based arithmetic encoding apparatus in accordance with a first embodiment of the present invention.

Referring to FIG. 1, there is provided a block diagram of an adaptive CAE apparatus 100 in accordance with a first embodiment of the present invention.

A current BAB is provided to a pre-scanning block 110 and a selection block 120 in parallel.

The pre-scanning block 110 detects binary value distribution characteristics between the pixels in the current BAB. To this purpose, the pre-scanning block 110 counts the number of pairs of adjacent pixels whose binary values are different from each other as vertically or horizontally scanning the current BAB and then compares the number of pairs with a predetermined threshold value TH1. Here, the pre-determined threshold value TH1 can be experimentally determined according to the binary value distribution characteristics of a picture. As a result of the comparison, if the number of the pairs is greater than the TH1, the pre-scanning block 110 generates a first selection signal CS1 and, if otherwise, produces a second selection signal CS2. The selection signal CS1 or CS2 is coupled to the selection block 120.

If the first selection signal CS1 is fed thereto, the selection block 120 provides the current BAB input thereto to a first encoding block 130 and a storage block 140 via lines L10 and L20, respectively. On the other hand, in response to the second selection signal CS2, the selection block 120 delivers the current BAB to the storage block 140 and a second encoding block 150 through lines L20 and L30, respectively. Consequently, either the first encoding block 130 or the second encoding block 150 is alternatively selected to encode the current BAB responsive to the selection signal CS1 or CS2 derived from the pre-scanning block 110.

Meanwhile, the storage block 140 produces a current bordered BAB having a border of width 2 around the current BAB as depicted in FIG. 8 based on the current BAB and previously encoded and reconstructed BAB's stored therein and provides the current bordered BAB to the first and the second encoding block 130 and 150 via lines L40 and L50, respectively.

Based on the current BAB, a bordered MC BAB produced as a result of a motion estimation and compensation of the current BAB as illustrated in the conventional encoding method and the current bordered BAB coupled from the storage block 140, the first encoding block 130 encodes the current BAB coupled thereto on a pixel-by-pixel basis by using a conventional CAE technique. On the other hand, the second encoding block 150 encodes the current BAB fed thereto on a subblock-by-subblock basis, wherein the current BAB is divided into a multiplicity of subblocks, each subblock having M×N pixels and whose size is smaller than that of a BAB, M and N being positive integers larger than 1, respectively.

Then, the encoded BAB data generated from either the first encoding block 130 or the second encoding block 150 is output to a transmitter for the transmission thereof via an encoded data providing block 160.

The encoding operation of the first and the second encoding block 130 and 150 will be illustrated with reference to FIGS. 2 and 3, respectively.

Figure 2:
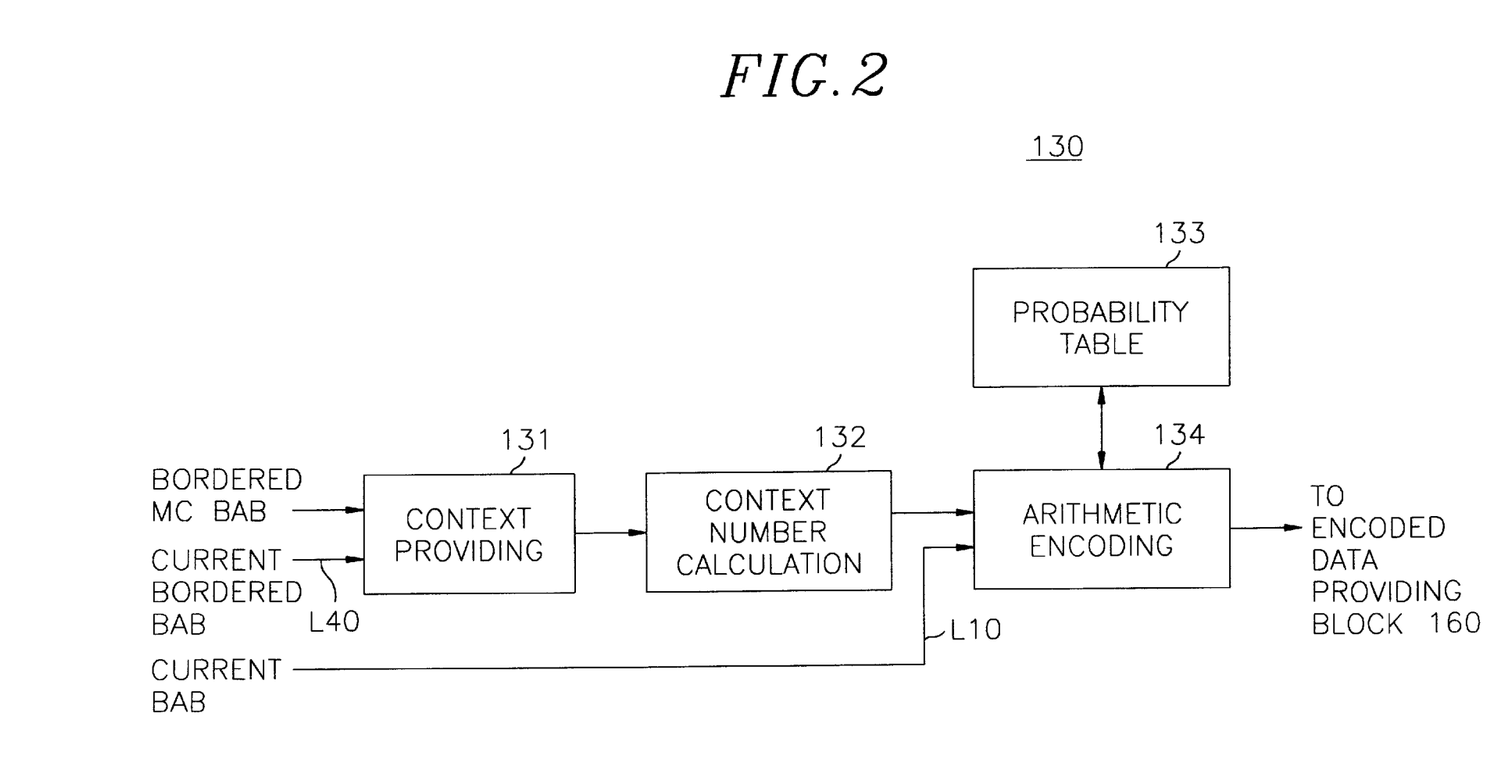
FIG. 2 illustrates an exemplary block diagram of the first encoding block 130 in FIG. 1.

In FIG. 2, there is illustrated an exemplary block diagram of the first encoding block 130 in FIG. 1.

A context providing block 131 selects an intra-context or an inter-context for each of the pixels in the current BAB in the same manner as in the conventional CAE technique based on the bordered MC BAB and the current bordered BAB on the line L40 and provides the selected context to a context number calculation block 132. For instance, for the intra-frame, the intra-context shown in FIG. 7A is selected, whereas, for the inter-frame, the inter-context described in FIG. 7B is chosen.

The context number calculation block 132 ciphers a context number corresponding to each of the pixels in the current BAB in the same manner as in the conventional CAE technique by using its corresponding context, i.e., either the intra-context or the inter-context. The context number corresponding to each of the pixels in the current BAB is fed to an arithmetic encoding block 134.

The arithmetic encoding block 134 detects a probability corresponding to the context number coupled from the context number calculation block 132 based on a probability table, stored in a probability table block 133, as in the prior art. Then, the arithmetic encoding block 134 codes the current BAB coupled thereto via the line L10 by using known arithmetic encoding techniques based on the detected probabilities corresponding to all of the pixels in the current BAB. The encoded BAB data is transferred to the encoded data providing block 160 in FIG. 1.

Figure 3:
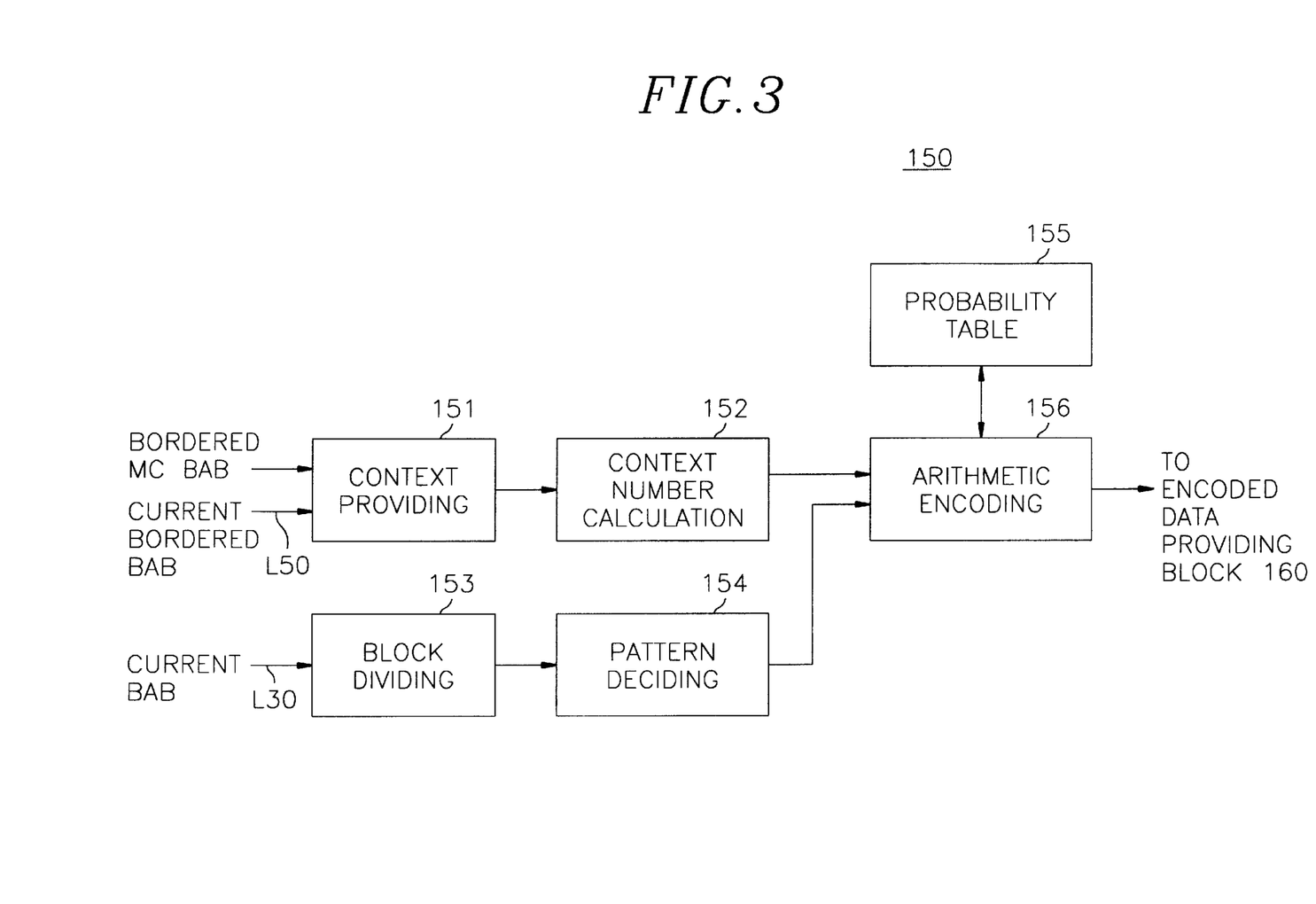
FIG. 3 depicts an exemplary block diagram of the second encoding block 150 in FIG. 1.

Referring to FIG. 3, there is depicted an exemplary block diagram of the second encoding block 150 in FIG. 1.

Figure 5A:
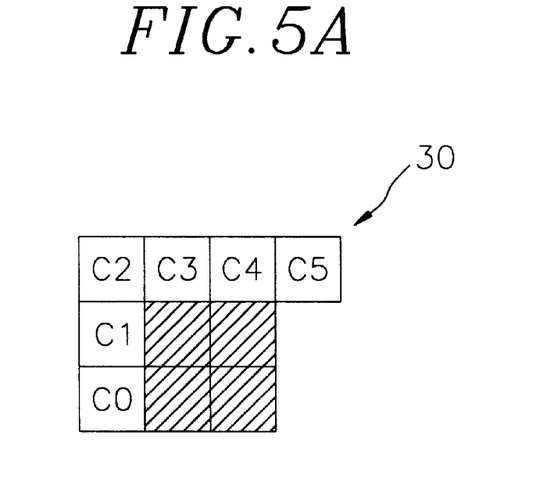
FIGS. 5A and 5B exemplify an intra-context and an inter-context for a subblock of 2×2 pixels in accordance with the present invention, respectively.
Figure 5B:
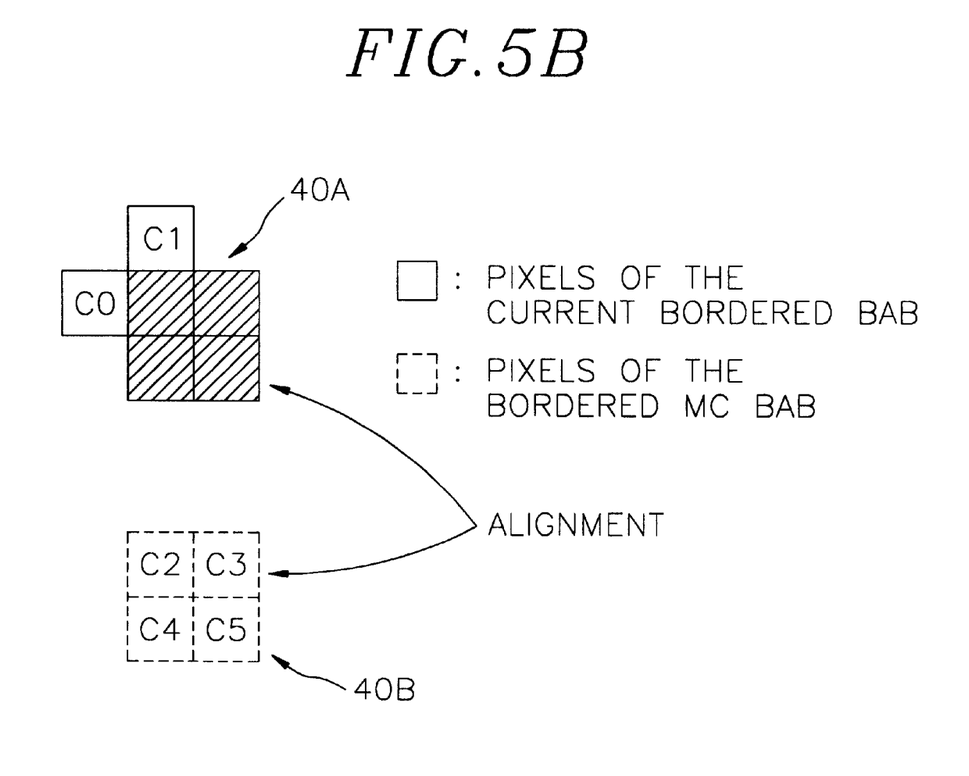

A context providing block 151 provides a context number calculation block 152 with either an intra-context or an inter-context corresponding to each of subblocks in the current BAB depending on the bordered MC BAB and the current bordered BAB coupled thereto via the line L50. In the above, each subblock has M×N, e.g., 2×2, pixels therein. Therefore, an intra-context 30 comprised of, e.g., C0 to C5 as shown in FIG. 5A is selected from the current bordered BAB and the inter-context is chosen as described in FIG. 5B from the current bordered BAB and the bordered MC BAB. Similarly to the conventional intra-context and inter-context for one pixel, the intra-context 30 is defined by 6 pixel values surrounding each subblock and the inter-context is composed of two subsets of pixels: a first subset of pixels 40A includes, e.g., C0 and C1, which are selected from the current bordered BAB and a second subset of pixels 40B includes, e.g., C2 to C5, which are chosen from the bordered MC BAB.

Then, the context number calculation block 152 computes a context number corresponding to each of the subblocks in the current BAB by using its corresponding context, i.e., either the intra-context or the inter-context. The context number corresponding to said each of the subblocks in the current BAB is fed to an arithmetic encoding block 156.

In the meantime, a block dividing block 153 partitions the current BAB, fed thereto via the line L30, into a plurality of subblocks, each subblock having 2×2 pixels therein, and provides each subblock to a pattern deciding block 154.

The pattern deciding block 154 determines a pattern of each subblock coupled thereto by checking binary pixel values therein. In accordance with the present invention, each subblock can be classified into one of 16 patterns, e.g., 0000, 0001 . . . , 1110, 1111, determined dependent on a combination of the 4 binary pixel values therein, wherein '1'corresponds to a binary pixel value 255. The pattern information of each subblock is supplied to the arithmetic encoding block 156.

The arithmetic encoding block 156 first selects a probability set corresponding to the context number of each subblock coupled from the context number calculation block 152 and finds a probability corresponding to the pattern of each subblock among probabilities included in the selected probability set based on a probability table stored in a probability table block 155 and the pattern information of each subblock provided from the pattern deciding block 154. In the above, the probability table contains $2^6$ number of probability sets corresponding to context numbers calculated by using the intra-context or the inter-context which is composed of C0 to C5, and each probability set has 16 number of probabilities therein, each probability corresponding to one of 16 patterns. Therefore, the arithmetic encoding block 156 codes the current BAB by using known arithmetic encoding techniques based on the detected probabilities of the subblocks in the current BAB. The encoded BAB data is transferred to the encoded data providing block 160 in FIG. 1.

In the first embodiment of the present invention, when each BAB of the binary shape signal is encoded through the use of one of the first and the second encoding technique, a mode signal, designating the encoding technique used to encode the BAB, is output together with the encoded BAB data through the arithmetic encoding block 134 or 156 and transferred to the transmitter via the encoded data providing block 160.

Figure 4:
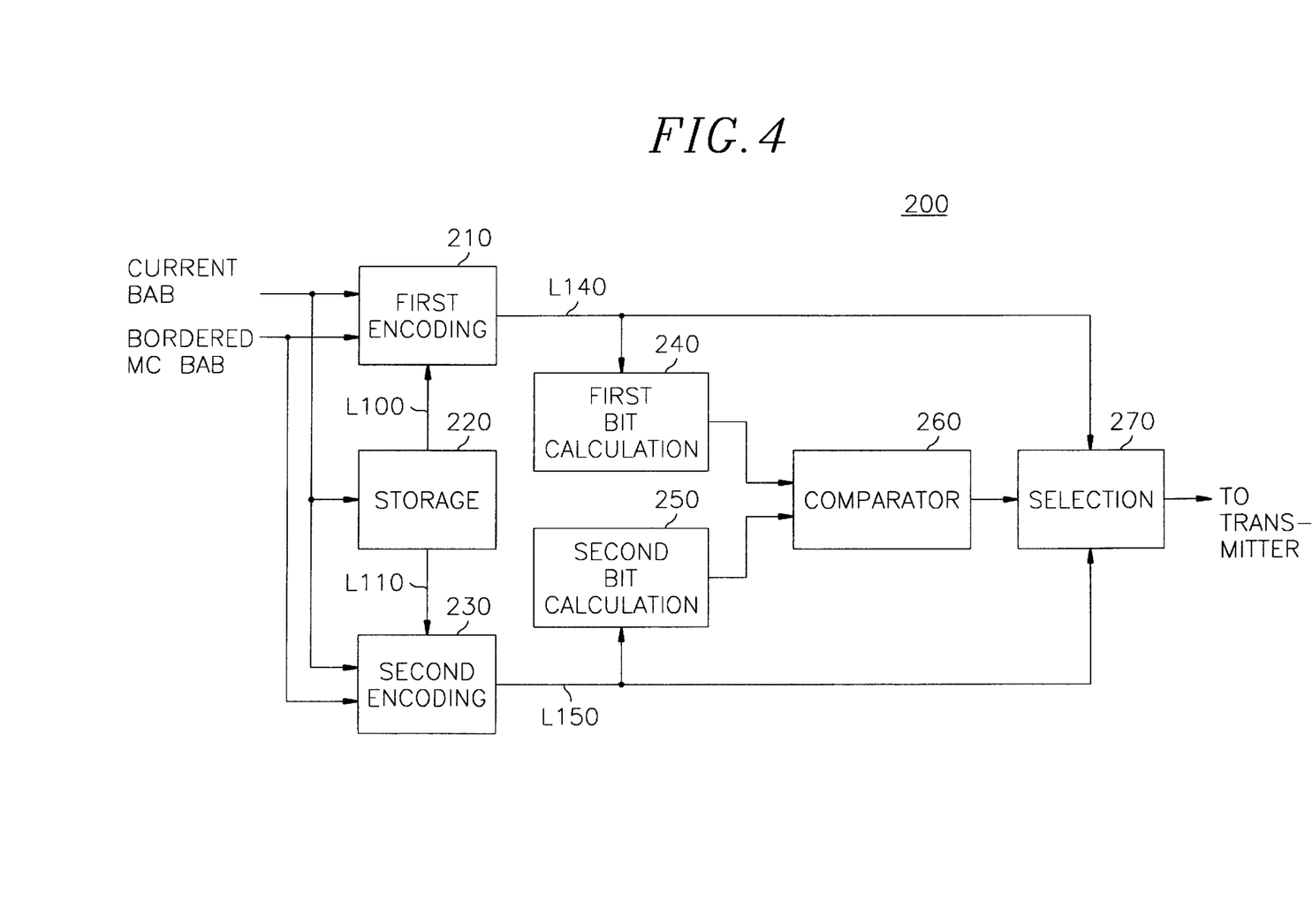
FIG. 4 is a block diagram of an adaptive context-based arithmetic encoding apparatus in accordance with a second embodiment of the present invention.

With reference to FIG. 4, there is illustrated a block diagram of an adaptive CAE apparatus 200 in accordance with a second embodiment of the present invention.

In contrast to the first embodiment, a current BAB is directly input to a first encoding block 210, a storage block 220 and a second encoding block 230, in parallel. A bordered MC BAB is coupled to the first and the second encoding block 210 and 230.

The storage block 220 produces a current bordered BAB having a border of width 2 around the current BAB as depicted in FIG. 8 based on the current BAB and previously encoded and reconstructed BAB's stored therein and provides the current bordered BAB to the first and the second encoding block 210 and 230 via lines L100 and L110, respectively.

The first encoding block 210 encodes the current BAB in the same manner as illustrated in connection with the first encoding block 130 in the first embodiment based on the current BAB, the bordered MC BAB and the current bordered BAB on the line L100, thereby outputting a first encoded BAB data to a first bit calculation block 240 and a selection block 270 via a line L140.

The second encoding block 230 encodes the current BAB in the same manner as described with reference to the second encoding block 150 in the first embodiment based on the current BAB, the bordered MC BAB and the current bordered BAB on the line L110, thereby producing a second encoded BAB data to a second bit calculation block 250 and the selection block 270 via a line L150.

The first bit calculation block 240 ciphers the number of bits of the first encoded BAB data and provides same as the calculated first bit number to a comparator 260.

Likewise, the second bit calculation block 250 computes the number of bits of the second encoded BAB data and delivers same as the calculated second bit number to the comparator 260.

The comparator 260 compares the first bit number with the second bit number to thereby provide a selection signal to control the operation of the selection block 270. For example, if the first bit number is smaller than or equal to the second bit number, a first selection signal CS1 is generated and, if otherwise, a second selection signal CS2 is produced.

Consequently, the selection block 270 chooses the first encoded BAB data on the line L140 in response to the first selection signal CS1; selects the second encoded BAB data on the line L150 under the control of the second selection signal CS2; and outputs the selected data as encoded BAB data for the current BAB to a transmitter for the transmission thereof.

In this embodiment, the adaptive CAE apparatus 200 also employs the first and the second encoding block whose structures and operation are identical to those depicted in connection with FIGS. 2 and 3. Therefore, their detailed explanations are omitted for the sake of simplicity.

Further, likewise in the first embodiment, when each BAB of the binary shape signal is encoded through the use of one of the first and the second encoding technique illustrated above, a mode signal, indicating the encoding technique used in encoding the BAB, is output together with the encoded BAB data to the transmitter.

Figure 6A:
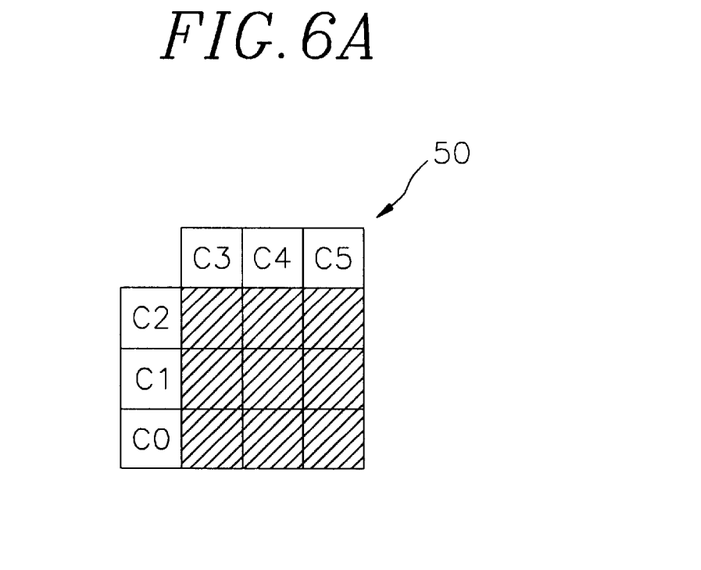
FIGS. 6A and 6B provide an intra-context and an inter-context for a subblock of 3×3 pixels in accordance with the present invention, respectively.
Figure 6B:
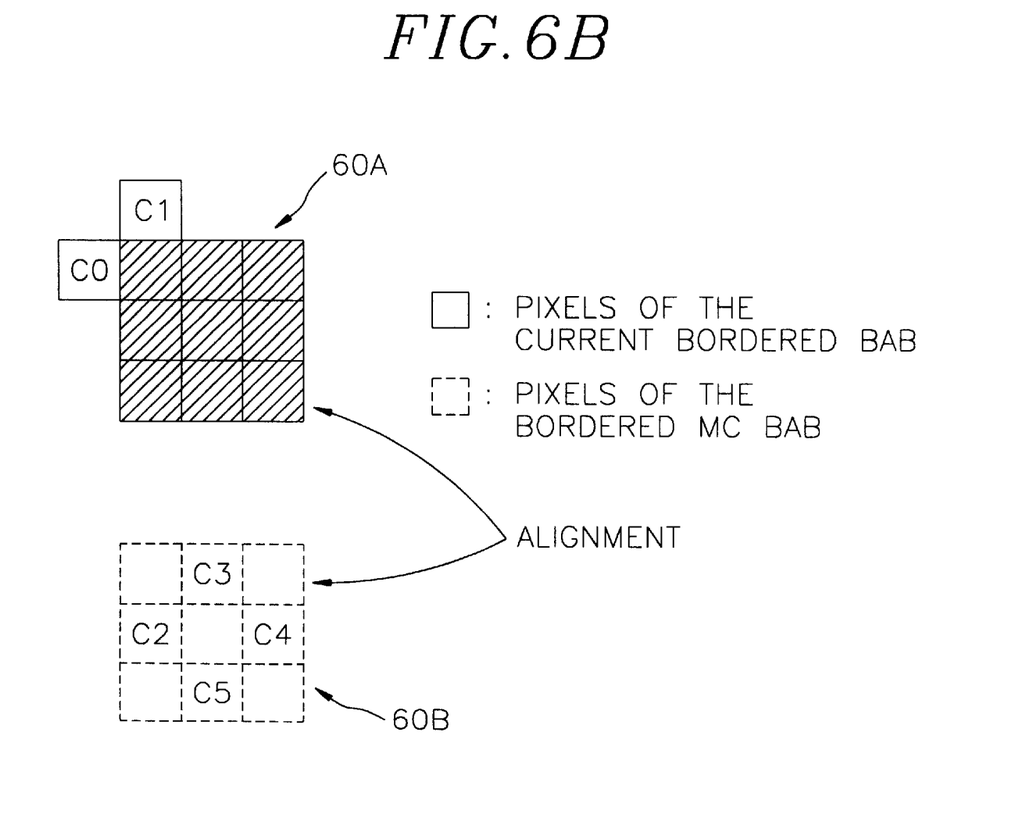

As shown above, although the first and the second embodiment employ the second encoding block which encodes the current BAB by dividing the current BAB into a plurality of subblocks, each containing 2×2 pixels therein, the size of a subblock is extendable. Exemplarily, in FIGS. 6A and 6B, there are shown an intra-context 50 and an inter-context 60A and 60B for a subblock of 3×3 pixels. Therefore, by connecting another encoding block processing the current BAB on an extended subblock unit to the adaptive CAE apparatus 100 or 200 in an appropriate manner, the encoding process of the current BAB can be effectively carried out.

While the present invention has been described with respect to the particular embodiments, it will be apparent to those skilled in the art that various changes and modifications may be made without departing from the spirit and scope of the invention as defined in the following claims.

What is claimed is:

1. A method for encoding a binary shape signal including a plurality of pixels, each pixel having one of two different binary values, comprising the steps of:

(a) detecting distribution characteristics between the pixels in the binary shape signal to thereby produce a first or a second selection signal;

(b) in response to the first selection signal, encoding the binary shape signal by using a first context-based arithmetic encoding technique for processing the binary shape signal on a pixel-by-pixel basis to thereby generate the encoded binary shape signal; and (c) under the control of the second selection signal, encoding the binary shape signal by using a second context-based arithmetic encoding technique for processing the binary shape signal on a subblock-by-subblock basis to thereby produce the encoded binary shape signal, wherein the binary shape signal is partitioned into a multiplicity of subblocks and the number of pixels in each subblock is smaller than the number of pixels in the binary shape signal and larger than 1, wherein the step (a) includes the steps of:

(a1) counting the number of pairs of adjacent pixels in the binary shape signal whose binary values are different from each other;

(a2) comparing the number of pairs with a predetermined threshold value; and (a3) producing the first or the second selection signal in conformity with the comparison result, wherein the first selection signal is generated if the number of the pairs is greater than the predetermined threshold value, and the second selection signal is produced if otherwise.

2. The method as recited in claim 1, wherein the step (c) includes the steps of:

(c1) dividing the binary shape signal into the multiplicity of subblocks, each subblock having M×N pixels, M and N being positive integers larger than 1, respectively;

(c2) determining a pattern of a target subblock, wherein the target subblock is selected among the subblocks and classified into one of $2^{M \times N}$ patterns decided depending on a combination of the pixel values in the target subblock;

(c3) providing a context corresponding to the target subblock, wherein the context is determined from the pixel values included in the subblocks processed prior to the target subblock;

(c4) calculating a context number of the target subblock by using the context;

(c5) finding a probability of the target subblock by using the context number and the pattern thereof;

(c6) repeating the steps (c2) to (c5) until probabilities for all of the subblocks are found; and (c7) arithmetically encoding the binary shape signal by using the probabilities for all of the subblocks to thereby produce the encoded binary shape signal.

3. The method as recited in claim 1, wherein the context corresponding to the target subblock is comprised of 6 pixel values included in the subblocks processed prior to the target subblock.

4. The method as recited in claim 3, wherein the target subblock has 2×2 pixels therein.

5. An apparatus for encoding a binary shape signal including a plurality of pixels, each pixel having one of two different binary values, comprising:

a detection means for producing a first or a second selection signal by detecting distribution characteristics between the pixels in the binary shape signal;

a first encoding means for operating in response to the first selection signal and encoding the binary shape signal by using a first context-based arithmetic encoding technique for processing the binary shape signal on a pixel-by-pixel basis to thereby generate the encoded binary shape signal; and a second encoding means for operating under the control of the second selection signal and encoding the binary shape signal by using a second context-based arithmetic encoding technique for processing the binary shape signal on a subblock-by-subblock basis to thereby produce the encoded binary shape signal, wherein the binary shape signal is partitioned into a multiplicity of subblocks and the number of pixels in each subblock is smaller than the number of pixels in the binary shape signal and larger than 1, wherein the detection means includes:

means for counting the number of pairs of adjacent pixels in the binary shape signal whose binary values are different from each other;

means for comparing the number of pairs with a predetermined threshold value; and means for producing the first or the second selection signal in conformity with the comparison result, wherein the first selection signal is generated if the number of the pairs is greater than the predetermined threshold value, and the second selection signal is produced if otherwise.

6. The apparatus according to claim 5, wherein the second encoding means includes:

means for dividing the binary shape signal into the multiplicity of subblocks, each subblock having M×N pixels, M and N being positive integers larger than 1, respectively;

means for determining a pattern of each of the subblocks to thereby generate pattern information representing the determined pattern, wherein said each of the subblocks is classified into one of $2^{M \times N}$ patterns decided depending on a combination of the pixel values therein;

means for providing a context corresponding to said each of the subblocks, wherein the context is determined from the pixel values included in the subblocks processed prior to said each of the subblocks;

means for computing a context number of said each of the subblocks by using the context;

means for finding a probability of said each of the subblocks by using the context number and the pattern information; and means for arithmetically encoding the binary shape signal by using probabilities for all of the subblocks to thereby produce the encoded binary shape signal.

7. The apparatus according to claim 5, wherein the context corresponding to said each of the subblocks is comprised of 6 pixel values included in the subblocks processed prior to said each of the subblocks.

8. The apparatus according to claim 7, wherein said each of the subblocks has 2×2 pixels therein.

* * * * *